United States Patent
Delson et al.

(10) Patent No.: US 10,721,135 B1
(45) Date of Patent: Jul. 21, 2020

(54) EDGE COMPUTING SYSTEM FOR MONITORING AND MAINTAINING DATA CENTER OPERATIONS

(71) Applicant: Bank of America Corporation, Charlotte, NC (US)

(72) Inventors: Kevin A. Delson, Woodland Hills, CA (US); Brandon Sloane, Charlotte, NC (US); Albena N. Fairchild, Indian Trail, NC (US); Siten Sanghvi, Jersey City, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/442,655

(22) Filed: Jun. 17, 2019

(51) Int. Cl.
| | |
|---|---|
| *H04L 12/26* | (2006.01) |
| *H04L 12/24* | (2006.01) |
| *H04W 4/38* | (2018.01) |
| *H04L 29/08* | (2006.01) |

(52) U.S. Cl.
CPC .......... *H04L 41/16* (2013.01); *H04L 41/0213* (2013.01); *H04L 67/12* (2013.01); *H04L 67/18* (2013.01); *H04W 4/38* (2018.02); *H04L 67/10* (2013.01)

(58) Field of Classification Search
CPC ... H04L 67/12; H04L 63/0428; H04L 63/168; H04L 67/18; H04M 1/72538; H04W 84/18
See application file for complete search history.

(56) References Cited

U.S. PATENT DOCUMENTS

| 8,024,451 B2 * | 9/2011 | Fowler ................. H04L 69/329 700/1 |
| 8,243,596 B2 | 8/2012 | Fedders et al. |
| 8,244,874 B1 | 8/2012 | Thireault |
| 9,900,725 B2 | 2/2018 | Young et al. |
| 10,552,294 B2 * | 2/2020 | Degaonkar ......... G06F 11/3013 |

(Continued)

OTHER PUBLICATIONS

Mary Shacklett, "Edge Computing: A Cheat Sheet," https://www.techrepublic.com/article/edge-computing-the-smart-persons-guide/, Jul. 21, 2017.

(Continued)

*Primary Examiner* — Chirag R Patel
(74) *Attorney, Agent, or Firm* — Weiss & Arons LLP; Michael A. Springs, Esq.

(57) ABSTRACT

A system for implementing edge computing and smart sensors at a data center is provided. The system may monitor behavior changes and collect data about servers within the data center. The system may make changes based on the collected data. The system may use simple network management protocol ("SNMP") to recover data and trace data at relatively rapid speeds. The system may be able to identify duplicate data records, copy the duplicate data records and eliminate the need to access a disaster recovery center. The system may also detect when a server is exceeding or nearly exceeding resource utilization. When a server is determined to be nearing a resource threshold, the server may transmit an alert and/or automatically place an order to upgrade resources. In some embodiments, the system may monitor multiple data centers. In these embodiments, each data center may be considered to be a server.

16 Claims, 8 Drawing Sheets

(56) References Cited

U.S. PATENT DOCUMENTS

| | | |
|---|---|---|
| 2017/0272342 A1* | 9/2017 | Zessin .................... H04L 41/12 |
| 2018/0121891 A1 | 5/2018 | Hosny et al. |
| 2018/0167445 A1 | 6/2018 | Speight et al. |
| 2018/0367314 A1 | 12/2018 | Egner et al. |
| 2019/0026450 A1 | 1/2019 | Egner et al. |

OTHER PUBLICATIONS

Paul Miller, "What is Edge Computing?" https://www.theverge.com/circuitbreaker/2018/5/7/17327584/ed9e-computing-cloud-google, May 7, 2018.

"What is Edge Computing," https://www.ge.com/digital/blog/what-edge-computing, GE Digital, Retrieved on May 16, 2019.

"Simple Network Management Protocol," https://en.wikipedia.org/wiki/Simple_Network_Management_Protocol, Wikimedia Foundation, Inc., May 27, 2019.

Margaret Rouse, "Simple Network Management Protocol (SNMP)," https://searchnetworking.techtarget.com/definition/SNMP, Retrieved on May 27, 2019.

* cited by examiner

EDGE COMPUTING SYSTEM FOR MONITORING AND MAINTAINING DATA CENTER OPERATIONS

FIELD OF TECHNOLOGY

This disclosure relates to edge computing. Specifically, this disclosure relates to using edge computing in data centers.

BACKGROUND OF THE DISCLOSURE

Entities execute millions of transactions throughout each day. Each executed transaction must be recorded and stored in order to accurately preserve the executed transaction. These transactions are typically recorded and stored in a data center.

Because disasters, such as floods, fires or electrical outages, may occur at a data center at any time, the data stored at a given data center may be replicated at one or more disaster recovery centers. Disaster recovery centers may store copies of the stored data, and may be accessed in the event that data becomes unavailable at the data center. It should be noted that access to and/or data retrieval from disaster recovery centers may be difficult, time-consuming, expensive and/or otherwise complicated. Because data recovery from a disaster recovery center may be difficult to execute, it may be desirable to maintain duplicate data within the data center itself in the event that a disaster recovery can be performed at the data center itself. Therefore, in the event that a portion of a data center goes offline or becomes unavailable, a copy of the unavailable data may be accessible. It may also be desirable to investigate the cause of the outage at the data center in an attempt to respond to the data center outage.

It may be further desirable to leverage edge computing devices within the data center to maintain and/or restore a data center. It would be further desirable for the edge computing devices to detect outages as well as remediate the detected outages at the data center.

SUMMARY OF THE DISCLOSURE

Systems and methods for monitoring, maintaining and/or restoring the operation of data centers is provided. The method may include detecting a change in a physical operation attribute and/or configuration attribute on a first data center node. The first data center node may be included in a plurality of data center nodes. The detecting may be performed by a software agent operating on a smart sensor of the first data center node. The smart sensor may include an embedded sensor, a low-power microprocessor and communication capabilities.

The method, according to the disclosure, may include alerting the low-power microprocessor of the change. The method may include investigating the cause of the change, and whether the change was intentional or unintentional. The first data center node may attempt to reverse the change when the change is unintentional.

When the change is unintentional and the change is unable to be reversed, a second data center may be identified and contacted. The identified second data center node may include the capability to reverse the change.

The method may include transmitting change data from the first data center node to the second data center node. The transmission may be via the software agent operating on the smart sensor of the first data center node and a software agent operating on a smart sensor of the second data center node. The method may include reversing, via a second data center node, the change on the first data center node.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Systems and methods for an edge computing system for monitoring and maintaining data center operations is provided. The system may include a plurality of data center nodes. Examples of data center nodes may be an electrical plug, an electrical outlet, a server, an electrical switch, a power supply, a display, a monitor, a cable modem, a router, a workstation, a printer, an access server, a bridge, a hub, an internet protocol ("IP") telephone, an IP video camera, a computer host and/or a combination thereof.

Data center nodes may be physically connected, wirelessly connected, operate together, operate independently and/or be dependent on one another. Each data center node may include a physical operation attribute. Examples of a physical operation attribute may be the presence of electrical power, whether a light is turned on or off, the status of a switch or any other suitable attribute.

Each data center node may include a configuration attribute. The configuration attribute may be a software attribute. Examples of a software attribute may be connectivity settings, WiFi settings, Bluetooth® settings, power settings and/or any other suitable software settings.

The system may also include a plurality of smart sensors. Each smart sensor may be affixed and/or linked to a data center node. Each smart sensor may include a plurality of capabilities. The capabilities may include an embedded sensor, a low-power microprocessor and communication capabilities. Communication capabilities may be wireless, wired, near field communication ("NFC"), Bluetooth® and any other suitable communication capabilities.

An embedded sensor may detect changes in attributes of a physical or virtual operating environment. For example, sensors may measure attributes such as audio, rainfall, movement, temperature, water levels, activity of other sensors, degree of power, degree of electricity, presence of another object, presence of a human being and/or any other suitable attributes.

A simple network management protocol ("SNMP") software agent may operate on each smart sensor. SNMP may be an internet standard protocol for collecting and organizing data on networks. The protocol may also be used to modify device behavior. SNMP may be used for network management and network monitoring. SNMP may be used on a variety of devices, such as internet of things ("IoT") devices, computer devices and any other suitable devices.

A SNMP agent operating on the smart sensor of a first data center node may detect a change in a physical operation attribute and/or configuration attribute of the first data center node. Upon detection of the change, the low-power microprocessor, included in the smart sensor of the first data center node, may be alerted. Also, upon detection of the change, the low-power microprocessor may investigate a cause of the change, and whether the change was intentional or unintentional. Also, upon detection of the change, the low-power microprocessor may attempt to reverse the change when the change is unintentional.

When the low-power microprocessor is unable to reverse the change, the microprocessor may identify a second data center node. The second data center node may include a capability to reverse the change. The first data center node may transmit change data, via the software agent included in the smart sensor of the first data center node, to the smart sensor included in the second data center node.

The change may be loss of a data segment. The cause of the change may be natural disaster. The second data center node may include a copy of the data segment. When a first data center node loses the data segment and the first data center node receives a request from a requestor for the lost data segment, the data center node directs the requestor to the second data center node that includes a copy of the data segment. In some embodiments, the first data center node and the second data center node may be different locations. Such an implementation may avoid the need to access the disaster recovery center.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
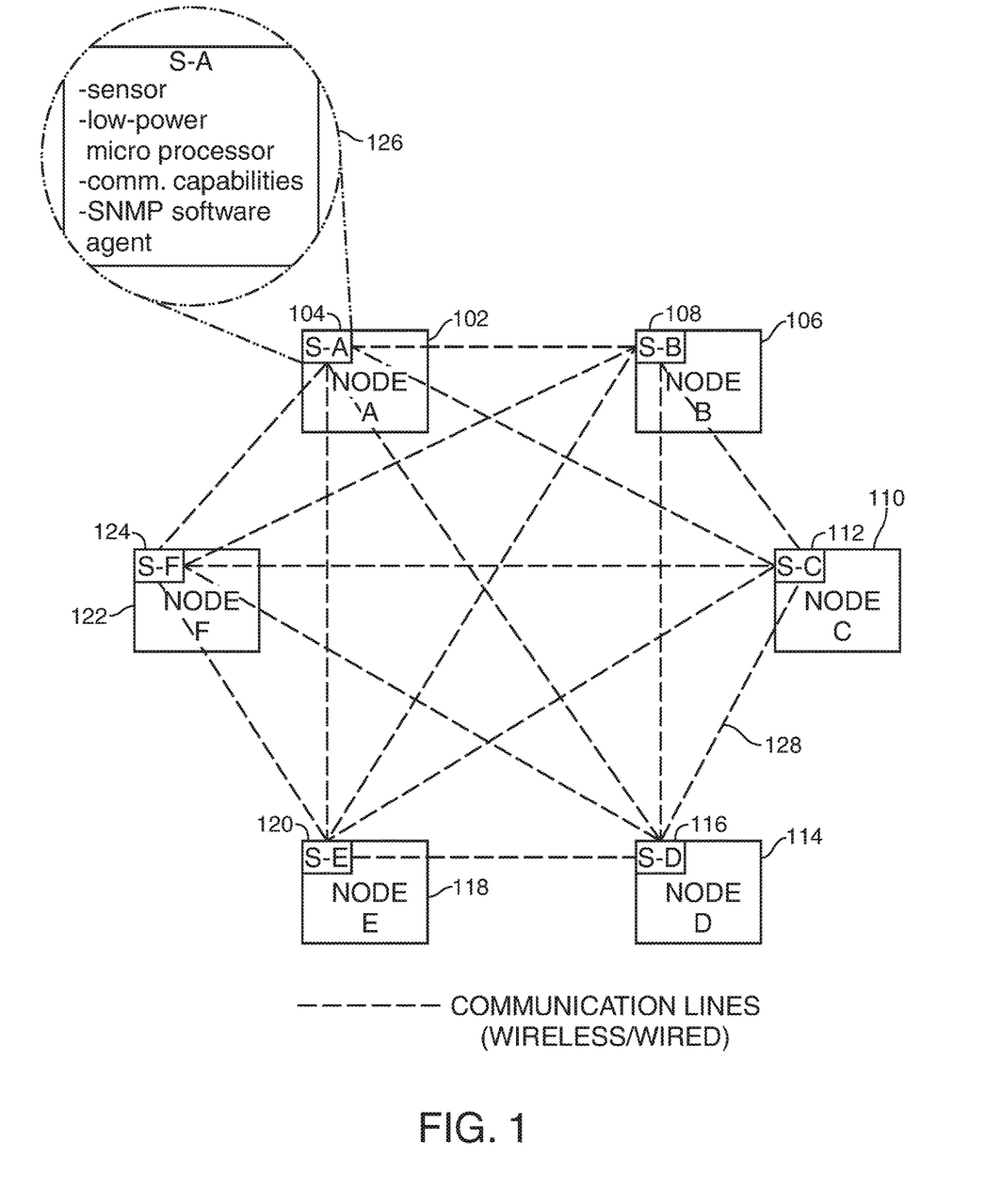
FIG. 1 shows an illustrative diagram in accordance with principles of the disclosure.

FIG. 1 shows an illustrative data center. The data center may include a plurality of nodes. Each node may be data center component, such as a server, computer, printer, electrical plug, switch, light or any other suitable data center component. Each node may include a smart sensor. The smart sensor may include a sensor, a low-power microprocessor, communication capabilities and an SNMP software agent. The smart sensor may include additional components and/or capabilities.

Node A, shown at 102, may include smart sensor 104. Smart sensor 104 may detect changes that occur in and around node A. Smart sensor 104 may, using the microprocessor, determine the cause of the change. Smart sensor 104 may communicate the change to one or more other smart sensors and/or a central server.

In an exemplary embodiment, node A may be server A. Smart sensor 104 may detect that, usually, between the hours of 1:00 PM and 6:00 PM, server A reaches the temperature of 82 degrees Fahrenheit. On an exemplary day, smart sensor 104 may detect that server A has reached the temperature of 100 degrees Fahrenheit. Smart sensor 104, using its microprocessor, may determine that server A may be overheating. In response to detecting the overheating, smart sensor 104 may instruct server A to shut down for a specific time period. In response to detecting the overheating, smart sensor 104 may communicate to another smart sensor and/or central server. The communication may include data relating to the overheating event.

Node B, shown at 106, may include smart sensor 108. Node C, shown at 110, may include smart sensor 112. Node D, shown at 114, may include smart sensor 116. Node E, shown at 118, may include smart sensor 120. Node F, shown at 122, may include smart sensor 124. Exemplary components of each smart sensor may be shown at 126. Components, such as A-F, may include a sensor, low-power microprocessor, communication capabilities and an SNMP software agent.

Smart sensors 104, 108, 112, 116, 120, 124 may communicate with each other, as shown at communication lines 128. The communications may be wired and/or wireless. The communications may be one-way communications. A one-way communication may be a communication where a smart sensor transmits a message to another smart sensor. The communications may be two-way communications. A two-way communication may be a communication between two smart sensors. In a two-way communication, a first smart sensor may transmit a message to a second smart sensor. Following receipt of the message, and the second smart sensor may transmit a response to the received message.

Figure 2A:
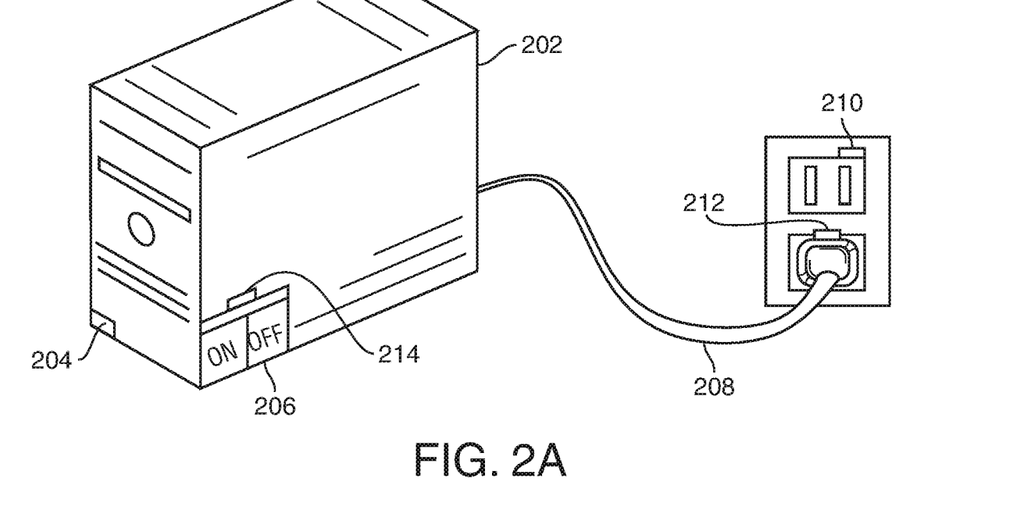
FIGS. 2A and 2B show illustrative diagrams in accordance with principles of the disclosure.

FIG. 2A shows illustrative server 202. Illustrative server 202 may include, be linked to and/or be associated with, smart sensor 204. Smart sensor 204 may capture data relating to server 202. Such data may include temperature data, server metadata and any other suitable data.

Illustrative server 202 may include electrical switch 206. Electrical switch 206 may include, be linked to and/or be associated with, smart sensor 214. Smart sensor 214 may capture data relating to electrical switch 206. Such data may include the status of switch 206 and any other suitable data.

Illustrative server 202 may be electrically coupled to electrical plug 208. Electrical plug 208 may include, be linked to and/or be associated with smart sensor 212. Smart sensor 212 may capture data relating to electrical plug 208. As shown in FIG. 2A, electrical plug 208 may be electrically coupled to electrical outlet 216.

Figure 2B:
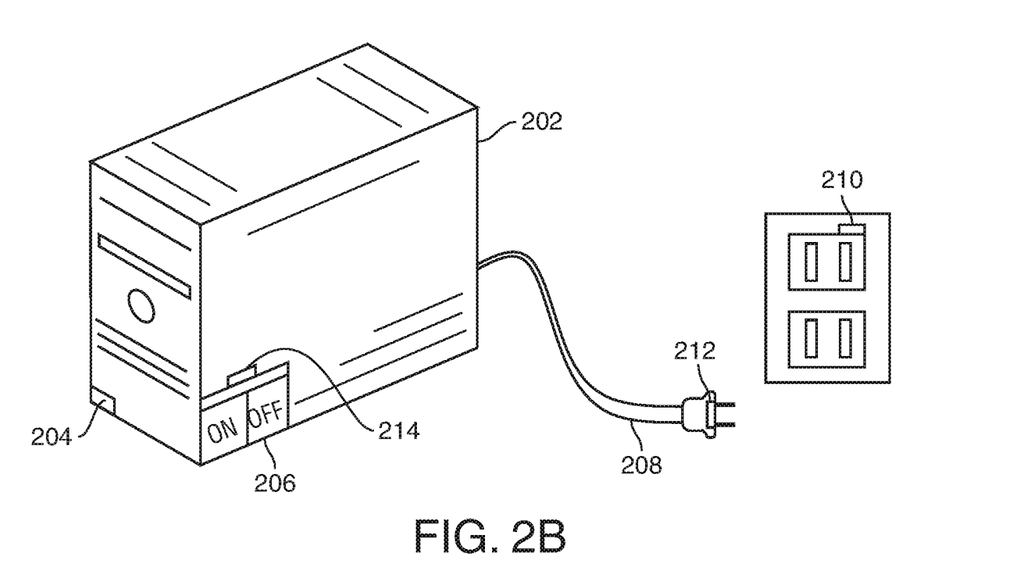

In FIG. 2B, electrical plug 208 may be separated from electrical outlet 216. It should be appreciated that upon separation of electrical plug 208 from electrical outlet 216, one or more of sensors 204, 210, 212 and 214 may detect the separation. In response to such a separation, each of sensors 204, 210, 212 and 214 may communicate with each other, to the extent necessary, in order to transmit the data that electrical plug 208 has been separated from electrical outlet 216. One or more of sensors 204, 210, 212 and 214 may transmit a message to a centralized server. The message may include data relating to the outage—i.e., the separation between electrical plug 208 and electrical outlet 216, and any data center components affected by the outage—i.e., server 202 has lost electrical power. The centralized server may dispatch a technician, or implement other remediation measures, to re-couple electrical plug 208 to electrical outlet 216.

In some embodiments, one or more smart sensors may be able to remediate the outage absent the intervention of a centralized server. Such an outage may include mechanical switch 206 being turned to the OFF position. In some embodiments, sensor 214 may include a robotic capability that is able to actuate switch 206 to the ON position.

Figure 3A:
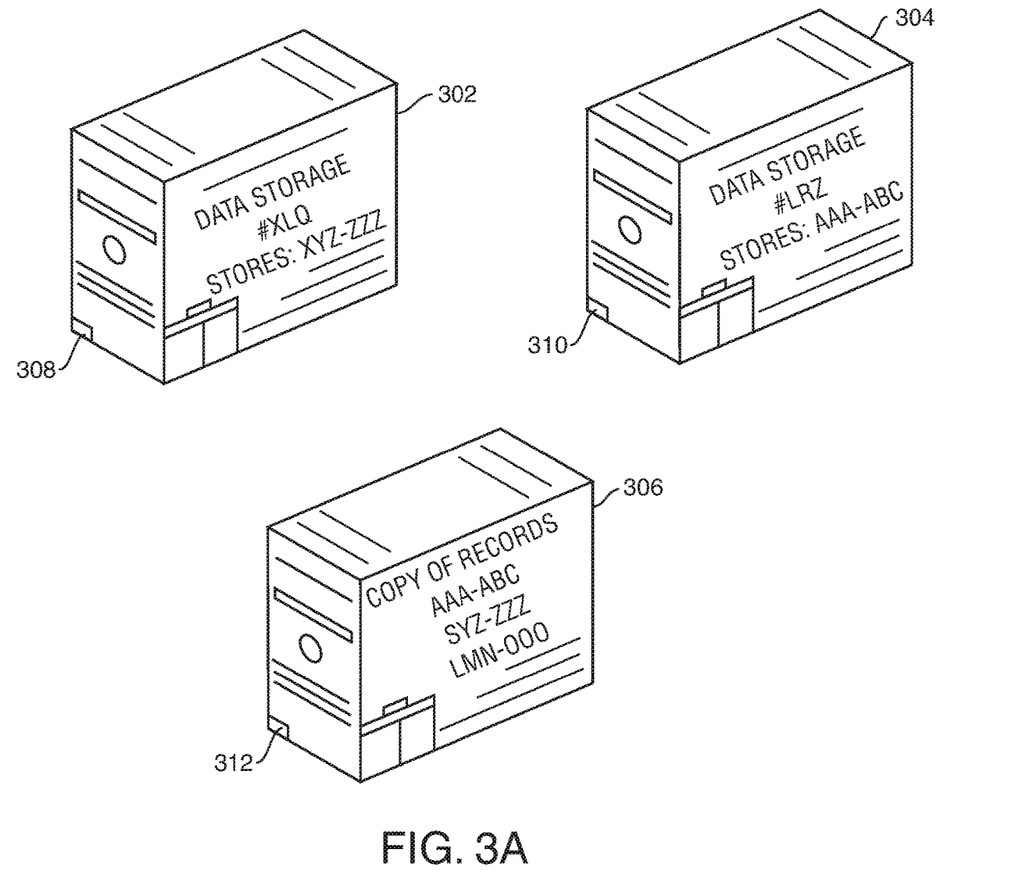
FIGS. 3A, 3B and 3C show illustrative diagrams in accordance with principles of the disclosure.

FIG. 3A shows an illustrative data center. The data center may include data storage unit XLQ, shown at 302, data storage unit LRZ, shown at 304, and copy of records, shown at 306. Data storage unit XLQ may store data records XYZ through ZZZ. Data storage unit XLQ may be linked to, associated with or otherwise coupled to sensor 308.

Data storage unit LRZ may store data records AAA through ABC. Data storage unit LRZ may be linked to, associated with or otherwise coupled to sensor 310.

Copy of records, shown at 306, may be stored in a backup data storage unit. The backup data storage unit may include copies of records included in other data storage units. Copy of records 306 may include copies of records AAA through ABC, XYZ through ZZZ and LMN through OOO. Copy of records 306 may be linked to, associated with or otherwise coupled to sensor 312.

Figure 3B:
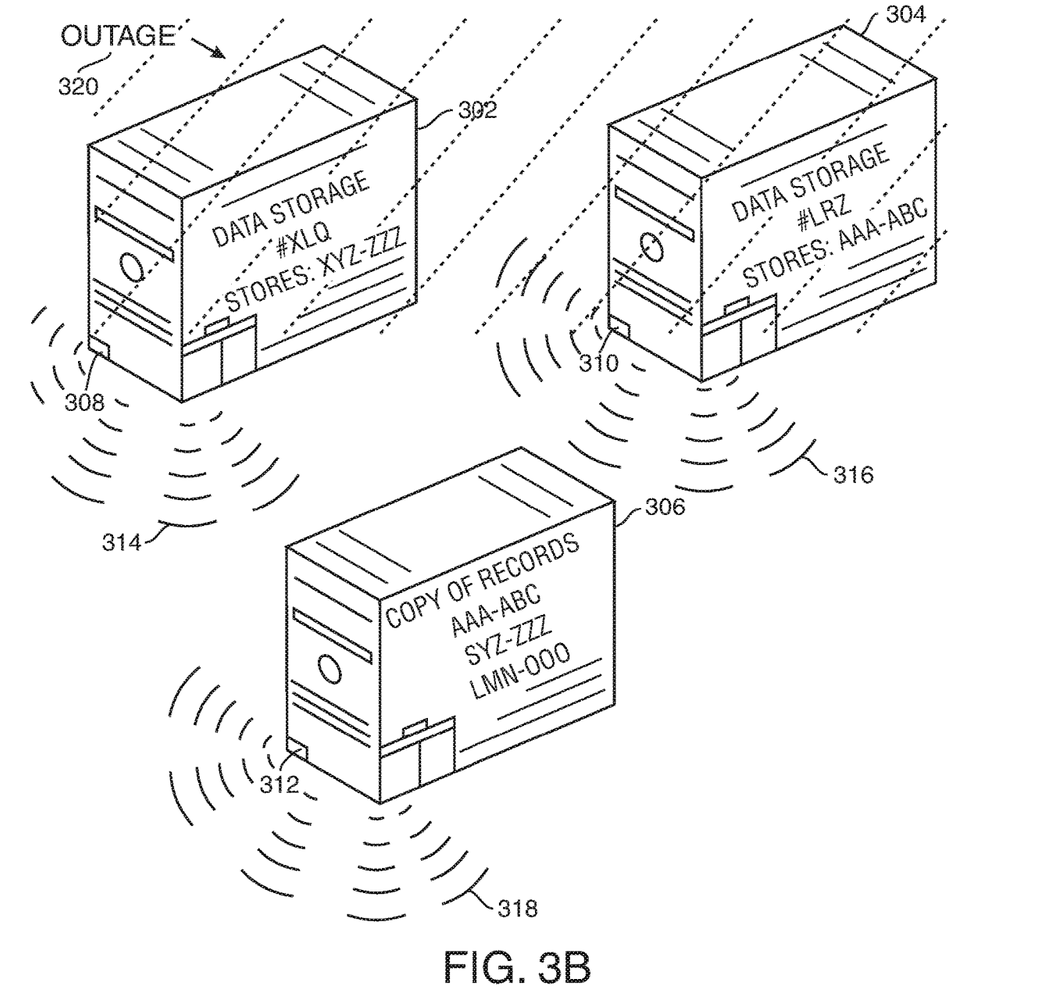

FIG. 3B shows an outage event occurring (320) to data storage units 302 and 304. Copy of records 306 may not have been affected by the outage. Sensor 308 may transmit signal 314. Signal 314 may relate to the outage. Sensor 310 may transmit signal 316. Signal 316 may relate to the outage. It should be appreciated that, at times, a sensor may have limited processing and/or transmission capabilities in the event of an outage. Signals 314 and 316 may include details relating to the outage. Such details may include the data records stored at the data storage units that have become unavailable as a result of the outage.

Sensor 312 may transmit signal 318. Signal 318 may include details, such as metadata, relating to data records that are available at copy of records 306.

Figure 3C:
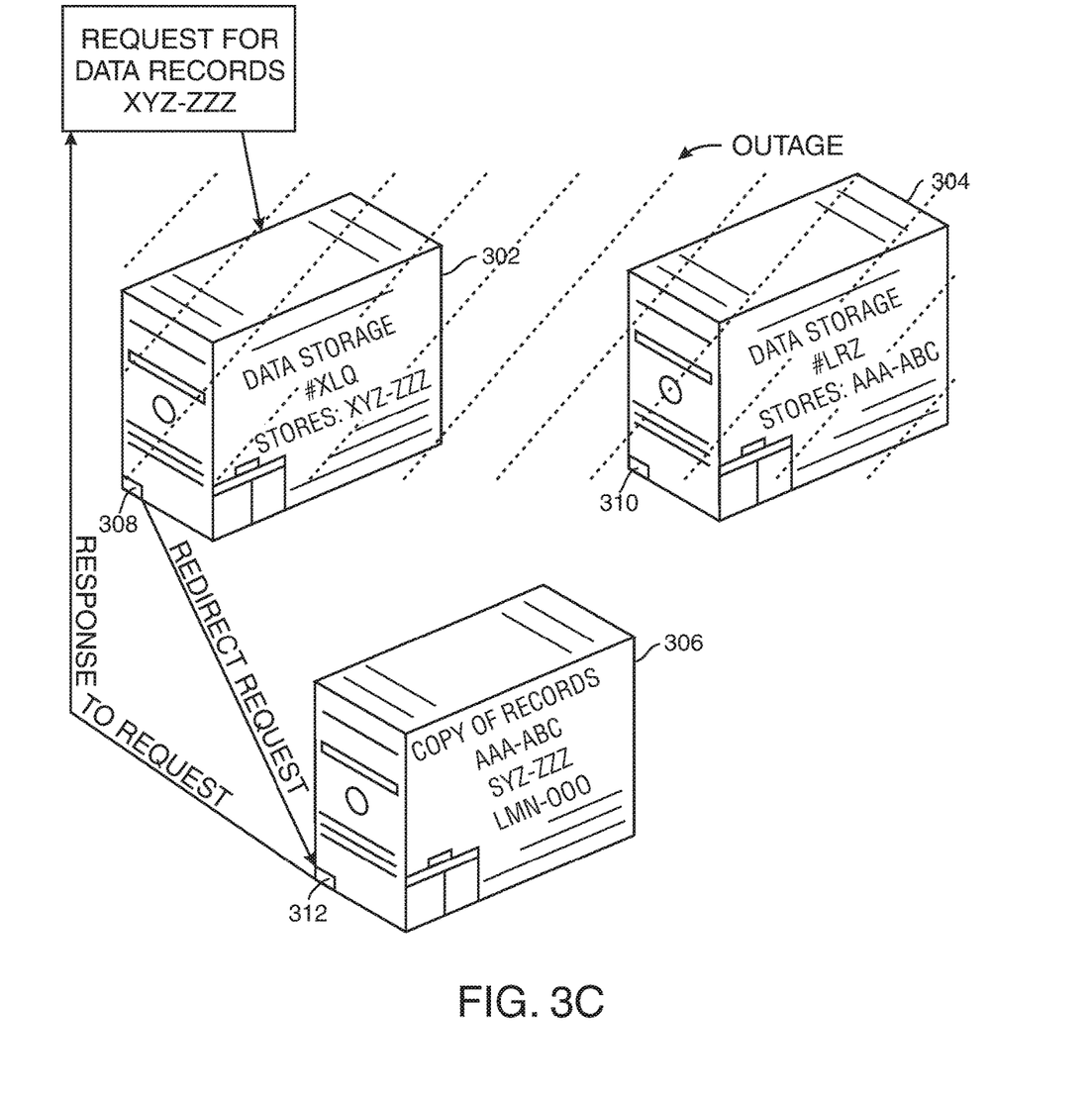

FIG. 3C shows request for records XYZ through ZZZ, shown at 322, being inputted to data storage unit 302. Because data storage unit 302 may be unavailable, sensor 308 may identify, based on the received signals, if there is a copy of the requested records within the data center. Sensor 308 may identify that copy of records 306 includes records XYZ through ZZZ. Sensor 308 may redirect the request to copy of records 306, which is associated with sensor 312. Sensor 312 and/or copy of records 306 may transmit a response to the request. The response may include a request for data records XYZ through ZZZ.

Figure 4:
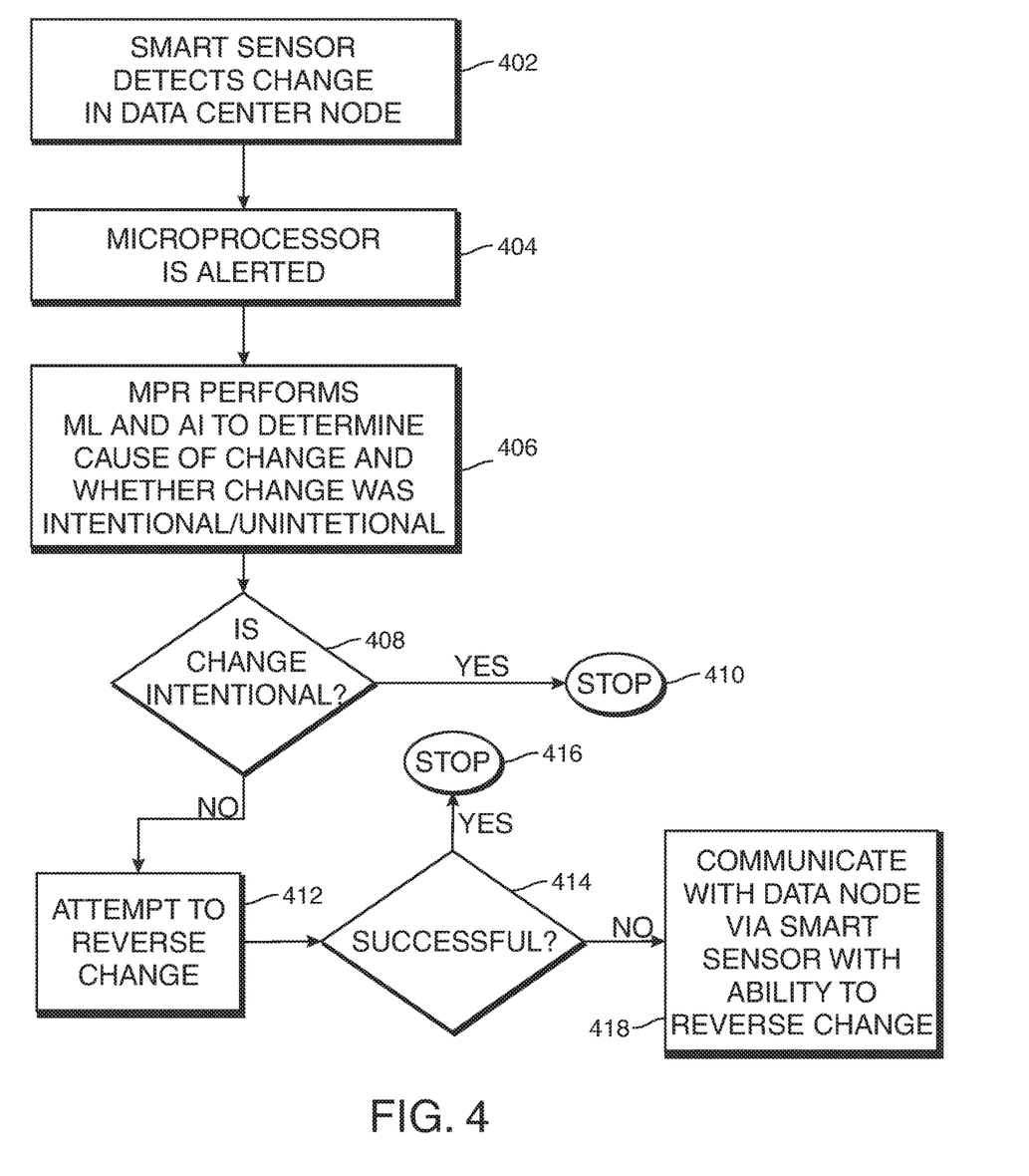
FIG. 4 shows an illustrative flow chart in accordance with principles of the disclosure.

FIG. 4 shows an illustrative flow chart. A smart sensor may detect a change in a data center node, as shown at 402. The microprocessor included in the sensor may be alerted, as shown at 404. The microprocessor may perform forensics to determine the cause of the change and whether the change was intentional or unintentional, as shown at 406.

If the change was intentional, the process may proceed from step 408 to step 410 and stop.

If the change was unintentional, the process may proceed from step 408 to step 412. Step 412 shows the system may attempt to reverse the change. If the change was successfully reversed, the process may proceed from step 414 to step 416, and stop. If the change was not successfully reversed, the process may proceed from step 414 to step 418. Step 418 shows the system communicating with a data center node via a smart sensor with an ability to reverse, and/or otherwise remediate, the change. The data center node may be a centralized server or any other suitable data center node.

Figure 5:
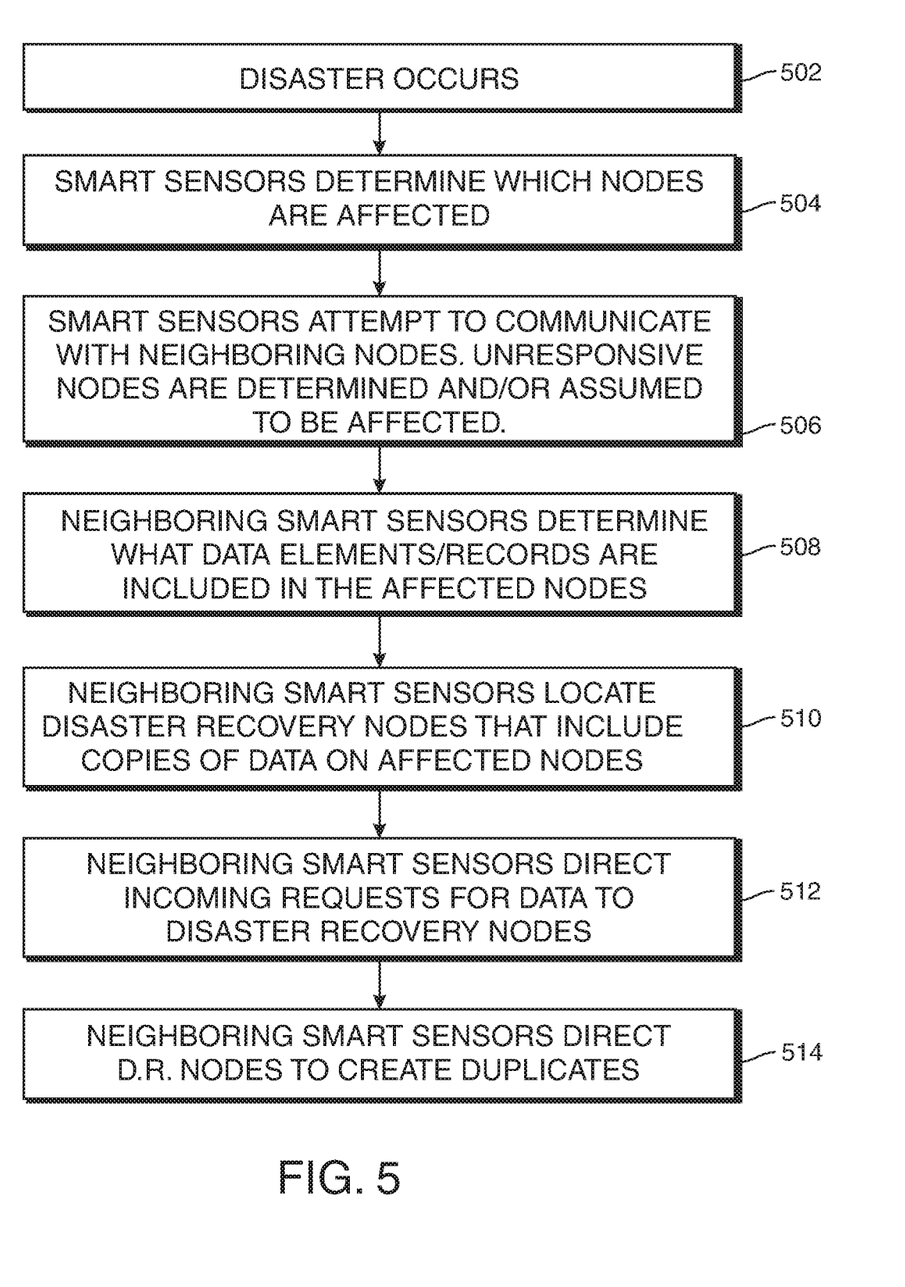
FIG. 5 shows another illustrative flow chart in accordance with principles of the disclosure.

FIG. 5 shows an illustrative flow chart. A natural disaster may occur, as shown at step 502. A smart sensor may determine which nodes are affected by the natural disaster, as shown 504.

After the disaster, operable smart sensors may attempt to communicate with neighboring nodes. Unresponsive nodes may be determined or assumed to be affected, as shown at 506.

Operable smart sensors may determine which data elements are included on out-of-service data center nodes, as shown at 508. The determination may be based on data that has been communicated prior to the outage. The determination may be based on a minimal amount of data communicated by the smart sensors associated with out-of-service during the outage. It should be appreciated that, at times, smart sensors associated with out-of-service nodes may be operable even though the associated nodes are inoperable.

Operable smart sensors may locate disaster recovery nodes that include copies of data on affected nodes, as shown at 510. Operable smart sensors may re-direct incoming requests, as needed, for data to disaster recovery nodes, as shown at 512.

Operable smart sensors may direct disaster recovery nodes to create duplicates of the data included on the disaster recovery nodes, as shown at 514. The duplicate data created from the disaster recovery node may be stored on a backup disaster recovery node. The backup disaster recovery node may be used in the event that the disaster recovery node experiences an outage.

Figure 6:
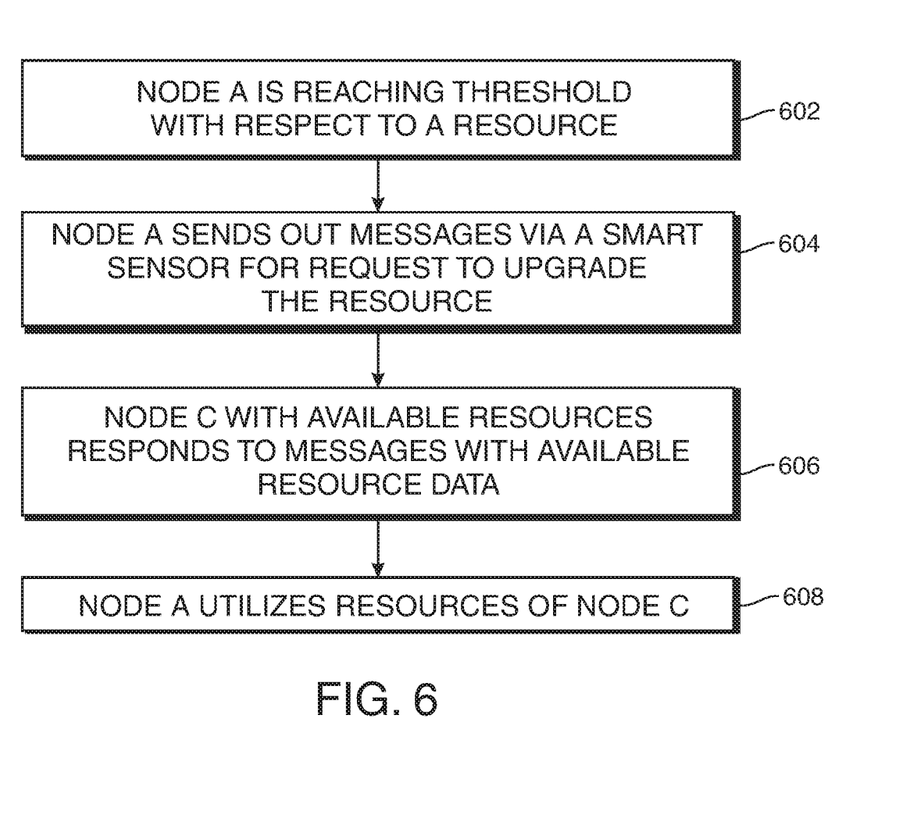
FIG. 6 shows yet another illustrative flow chart in accordance with principles of the disclosure.

FIG. 6 shows an illustrative flow chart. Node A may reach a threshold with respect to a specific resource, as shown at 602. For example, node A may be using more than 85% of its memory.

Node A may send out messages via a smart sensor. The messages may include a request to upgrade the resource, as shown at 604.

Node C may receive the messages. Node C may determine that Node C includes additional unused memory resources. Node C may respond to the message with the available resource data, as shown at 606.

Node A may communicate with Node C to utilize the available resources of Node C, as shown at 608.

Thus, an edge computing system for monitoring and maintaining data center operations is provided. Persons skilled in the art will appreciate that the present invention can be practiced by other than the described embodiments, which are presented for purposes of illustration rather than of limitation. The present invention is limited only by the claims that follow.

What is claimed is:

1. A system for monitoring and maintaining the operation of data centers, the system comprising:
  a plurality of data center nodes, each data center node, included in the plurality of data center nodes, comprising at least one of:
    a physical operation attribute; or
    a configuration attribute;
  a plurality of smart sensors, each smart sensor, included in the plurality of smart sensors being affixed to a data center node included in the plurality of data center nodes, each smart sensor included in the plurality of smart sensors comprising:

an embedded sensor;
a low-power microprocessor; and
communication capabilities;
a simple network management protocol ("SNMP") software agent operating on each smart sensor included in the plurality of smart sensors;
wherein, when, on a first data center node, the SNMP software agent operating on the smart sensor associated with the first data center node, detects a change in a physical operation attribute and/or a configuration attribute of the first data center node:
    the low-power microprocessor included in the smart sensor of the first data center node, is alerted;
    the low-power microprocessor included in the smart sensor of the first data center node, investigates a cause of the change, and whether the change was intentional or unintentional;
    the low-power microprocessor included in the smart sensor of the first data center node, attempts to reverse the change when the change is unintentional; and
    when the low-power microprocessor included in the smart sensor of the first data center node, is unable to reverse the change, the low-power microprocessor included in the smart sensor of first data center node identifies a second data center node, included in the plurality of data center nodes, that includes a capability to reverse the change, and the first data center node transmits change data, via the software agent included smart sensor of the first data center node, to the smart sensor included in the second data center node.

2. The system of claim 1, wherein each data center node included in the plurality of data center nodes is:
an electrical plug;
an electrical outlet;
a server;
an electrical switch;
a power supply;
a display;
a monitor;
a cable modem;
a router;
a workstation;
a printer;
an access server;
a bridge;
a hub;
an internet protocol ("IP") telephone;
an IP video camera;
a computer host; or
a combination thereof.

3. The system of claim 1, wherein the communication capabilities are wireless.

4. The system of claim 3, wherein the wireless communication capabilities comprise near field communication ("NFC").

5. The system of claim 3, wherein the wireless communication capabilities comprise Bluetooth® communication.

6. The system of claim 1, wherein:
the change is a loss of a data segment;
the cause of the change is a natural disaster; and
the second data center node includes a copy of the data segment.

7. The system of claim 6, wherein, when the first data center node loses the data segment, and the first data center node receives a request, from a requestor, for the data segment, the first data center node directs the requestor to the second data center node that includes a copy of the data segment.

8. The system of claim 7, wherein the first data center node is located in a first data center location, the second data center node is located in a second data center location and the first data center location and the second data center location are different.

9. A method for monitoring and maintaining the operation of data centers, the method comprising:
detecting a change in a physical operation attribute and/or a configuration attribute on a first data center node, said first data center node being included in a plurality of data center nodes, the detecting being performed by a simple network management protocol ("SNMP") agent operating on a smart sensor of the first data center node, the smart sensor comprising an embedded sensor, a low-power microprocessor and communication capabilities;
alerting the low-power microprocessor of the change;
investigating the cause of change, and whether the change was intentional or unintentional;
attempting, at the first data center node, to reverse the change when the change is unintentional;
identifying, when the change is unintentional and unable to be reversed, a second data center node, included in the plurality of data center nodes, said second data center node including a capability to reverse the change; and
transmitting change data from the first data center node to the second data center node, via the SNMP agent operating on the smart sensor of the first data center node and an SNMP agent operating on a smart sensor of the second data center node; and
reversing, via the second data center node, the change on the first data center node.

10. The method of claim 9, wherein each data center node included in the plurality of data center nodes is:
an electrical plug;
an electrical outlet;
a server;
an electrical switch;
a power supply;
a display;
a monitor;
a cable modem;
a router;
a workstation;
a printer;
an access server;
a bridge;
a hub;
an internet protocol ("IP") telephone;
an IP video camera;
a computer host; or
a combination thereof.

11. The method of claim 9, wherein the communication capabilities are wireless.

12. The method of claim 11, wherein the communication capabilities comprise near field communication ("NFC").

13. The method of claim 11, wherein the wireless communication capabilities comprise Bluetooth® communication.

14. The method of claim 9, wherein:
the change is a loss of a data segment;
the cause of the change is a natural disaster; and the second data center node includes a copy of the data segment.

15. The method of claim 14, wherein, when the first data center node loses the data segment, and the first data center node receives a request, from a requestor, for the data segment, the first data center node directs the requestor to the second data center node that includes a copy of the data segment.

16. The method of claim 15, wherein the first data center node is located in a first data center location, and the second data center node is located in a second data center location and the first data center location and the second data center location are different.

* * * * *